United States Patent
Liao et al.

(10) Patent No.: US 10,009,948 B2
(45) Date of Patent: Jun. 26, 2018

(54) METHOD AND SYSTEM FOR IMPLEMENTING BACKUP AND BINDING BETWEEN TERMINALS BY SENDING IDENTIFIER TO A CLOUD END SERVER

(71) Applicant: SHENZHEN TCL NEW TECHNOLOGY CO., LTD, Shenzhen, Guangdong (CN)

(72) Inventors: Hongtao Liao, Guangdong (CN); Jiawen Hu, Guangdong (CN); Hong Zeng, Guangdong (CN); Yunhua Wang, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 121 days.

(21) Appl. No.: 15/107,479

(22) PCT Filed: Dec. 12, 2014

(86) PCT No.: PCT/CN2014/093709
§ 371 (c)(1),
(2) Date: Jun. 23, 2016

(87) PCT Pub. No.: WO2016/033900
PCT Pub. Date: Mar. 10, 2016

(65) Prior Publication Data
US 2016/0330777 A1    Nov. 10, 2016

(30) Foreign Application Priority Data
Sep. 2, 2014    (CN) .......................... 2014 1 0442627

(51) Int. Cl.
H04L 29/06    (2006.01)
H04W 76/11    (2018.01)
(Continued)

(52) U.S. Cl.
CPC ........... *H04W 76/11* (2018.02); *H04L 9/0643* (2013.01); *H04L 29/08* (2013.01);
(Continued)

(58) Field of Classification Search
CPC .............. H04W 76/021; H04W 76/023; H04L 63/0428; H04L 63/0876
(Continued)

(56) References Cited

U.S. PATENT DOCUMENTS 9,235,832 B1 * 1/2016 Billman ............... G06Q 20/388
726/7
2004/0076277 A1 * 4/2004 Kuusinen ............ H04L 12/1822
379/202.01
(Continued)

FOREIGN PATENT DOCUMENTS

| CN | 103078788 A | 5/2013 |
|----|-------------|--------|
| CN | 103347306 A | 10/2013 |
| WO | 2012154101 A1 | 11/2012 |

OTHER PUBLICATIONS

Extended European Search Report of counterpart European Patent Application No. 14901015.9 dated Mar. 22, 2018.
(Continued)

*Primary Examiner* — Haresh N Patel (57) ABSTRACT

Disclosed in the present disclosure is a method for implementing automatic binding of a first and second terminal, the first and second terminal pre-install an identical application, and the method includes: the second terminal generates a first identifier including the application information, and sends the first identifier to the second terminal; the second terminal generates a second identifier including the application information, and generates a third identifier to a cloud end server to perform backup and binding, so that the first and second terminal can perform interaction. The present disclosure also provides a system for implementing auto-
(Continued)

matic binding of the first and second terminal. The present disclosure enables the first terminal to interact with the exclusively corresponding second terminal based on the application of an identical network platform.

16 Claims, 9 Drawing Sheets

(51) Int. Cl.
    *H04W 76/14*     (2018.01)
    *H04L 29/08*     (2006.01)
    *H04L 9/06*     (2006.01)
    *H04W 8/26*     (2009.01)
    *H04W 76/02*     (2009.01)
    *H04W 12/00*     (2009.01)

(52) U.S. Cl.
    CPC ...... *H04L 63/0428* (2013.01); *H04L 63/0876* (2013.01); *H04L 67/1095* (2013.01); *H04W 8/26* (2013.01); *H04W 12/00* (2013.01); *H04W 76/021* (2013.01); *H04W 76/023* (2013.01); *H04W 76/14* (2018.02)

(58) Field of Classification Search
    USPC .......................................................... 726/7
    See application file for complete search history.

(56) References Cited

U.S. PATENT DOCUMENTS

| | | | |
|---|---|---|---|
| 2007/0207770 A1* | 9/2007 | Ikaheimo | H04W 24/08 455/403 |
| 2008/0189550 A1* | 8/2008 | Roundtree | G06F 21/51 713/176 |
| 2009/0285118 A1* | 11/2009 | Yoshikawa | G06Q 40/00 370/254 |
| 2009/0287829 A1* | 11/2009 | Matuszewski | H04L 29/12509 709/228 |
| 2013/0061037 A1* | 3/2013 | Zhang | H04L 63/0435 713/150 |
| 2014/0169271 A1* | 6/2014 | Awano | H04W 8/12 370/328 |
| 2014/0256366 A1* | 9/2014 | Gheri | H04W 4/14 455/466 |
| 2014/0295765 A1* | 10/2014 | Wei | H04W 4/008 455/41.2 |
| 2014/0325628 A1* | 10/2014 | Huang | H04L 63/0853 726/7 |
| 2016/0316311 A1* | 10/2016 | Holtmanns | H04W 12/06 726/7 |

OTHER PUBLICATIONS

Discussion on D2D Direct Communication, 3GPP TSG-RAN WG2 Meeting #83 R2-132681, Aug. 19, 2013, pp. 1-5.
ProSe Discovery, SA WG2 Meeting S2#98 S2-133358, Jul. 15, 2013, pp. 1-11.
Sergey Andreev et al., Cellular Traffic Offloading onto Network-Assisted Device-to-Device Connections, IEEE Communications Magazine, Feb. 12, 2014, vol. 52, No. 4, pp. 20-31.

* cited by examiner

METHOD AND SYSTEM FOR IMPLEMENTING BACKUP AND BINDING BETWEEN TERMINALS BY SENDING IDENTIFIER TO A CLOUD END SERVER

TECHNICAL FIELD

The present disclosure relates to the field of communications, and in particular, to a method and system for implementing automatic binding of a first and second terminal.

BACKGROUND

Every transform of Internet not only brings opportunities, but also overturns traditional thinking. There is no distance limits by using WeChat, so that, after registering WeChat, users can form relationships with "friends" nearby who also registers WeChat. Therefore, people from all walks of life keeps up with the trend of the times, and joins in the world of WeChat one after another since the TENCENT launched. If a cellphone can interact with a second terminal, it may bring a lot of convenience, and improve user experience of the second terminal. For example, movies are pushed to the second terminal by the use of cellphone, even the second terminal is controlled by the use of cellphone. However, there is still lack of an only interactive method for implementing binding of cellphone and the second terminal.

The above contents are merely used to help to understand the disclosure, does not mean the contents are admitted as a prior art.

SUMMARY

An objective of the present disclosure is to solve technical issue of only interactive binding of a first and second terminal.

In order to achieve the above described objective, the present disclosure provides a method for implementing automatic binding of a first and second terminal, wherein the first terminal and the second terminal pre-install an application which based on identical network platform, the method for implementing automatic binding of the first and second terminal includes: generating, by the first terminal, a first identifier including the application information, and sending the first identifier to the second terminal; generating, by the second terminal, a second identifier including the application information, and generating a third identifier according to the second identifier and the received first identifier; and sending, by the second terminal, the third identifier to a cloud end server to perform backup and binding, so that the first and second terminal can perform interaction.

Preferably, the specific step of the generating, by the first terminal, a first identifier including the application information includes: acquiring, by the first terminal, a first device number and a first setup number of the application; and generating, by the first terminal, the first identifier according to the first device number and the first setup number.

Preferably, the specific step of the generating, by the first terminal, the first identifier according to the first device number and the first setup number of the application includes: shifting, by the first terminal, the first device number left by N digits, wherein N is the number of digits of the first setup number; and performing, by the first terminal, or operation bit-by-bit on the first device number which is shifted left by N digits, and generating the first identifier; or shifting, by the first terminal, the first setup number left by M digits, wherein M is the number of digits of the first device number; and performing, by the first terminal, or operation bit-by-bit on the setup device number which is shifted left by M digits, and generating the first identifier.

Preferably, the specific step of the generating, by the second terminal, a second identifier including the application information includes: acquiring, by the second terminal, a second device number and a second setup number of the application; and generating, by the second terminal, the second identifier according to the second device number and the second setup number.

Preferably, the first device number is a IMEI of the first terminal or a combination of a type number of the first terminal and the IMEI of the first terminal, and the second device number is a device number of the second terminal or a combination of a type number of the second terminal and the device number of the second terminal.

Preferably, after step of the generating, by the second terminal, a second identifier including the application information, and generating a third identifier according to the second identifier and the received first identifier, and before step of the sending, by the second terminal, the third identifier to a cloud end server to perform backup and binding, so that the first and second terminal can perform interaction, the method includes: operating, by the second terminal, hash algorithm to encrypt the third identifier.

In addition, in order to achieve the above described objective, the present disclosure provides a system for implementing automatic binding of a first and second terminal, including the first terminal provided with a first identifier generating module, and the second terminal provided with a second identifier generating module and a binding module, wherein: the first terminal and the second terminal pre-install an application which based on identical network platform; and the first identifier generating module is configured to generate a first identifier including the application information and send the first identifier to the second terminal; and the second identifier generating module is configured to generate a second identifier including the application information; and a third identifier generating module is configured to generate the third identifier according to the second identifier and the received first identifier; and the binding module is configured to send the third identifier to a cloud end server to perform backup and binding, so that the first and second terminal can perform interaction.

Preferably, the first identifier generating module including: a first number acquiring unit, configured to acquire a first device number and a first setup number of the application; and a first number combining unit, configured to generate the first identifier according to the first device number and the first setup number.

Preferably, the first number combining unit is further configured to shift the first device number left by N digits wherein N is the number of digits of the first setup number, and configured to perform or operation bit-by-bit on the first device number which is shifted left by N digits and generate the first identifier; or the first number combining unit is further configured to shift the first setup number left by M digits wherein M is the number of digits of the first device number, and configured to perform or operation bit-by-bit on the first setup number which is shifted left by M digits and generating the first identifier;

Preferably, the second identifier generating module includes: a second number acquiring unit, configured to acquire a second device number and a second setup number; a second number combining unit, configured to generate the second identifier according to the second device number and the second setup number; and a third identifier generating unit, configured to generate the third identifier according to the second identifier and the received first identifier;

Preferably, the first device number is a IMEI of the first terminal or a combination of a type number of the first terminal and the IMEI of the first terminal, and the second device number is a device number of the second terminal or a combination of a type number of the second terminal and the device number of the second terminal.

Preferably, the second terminal further includes: a hash algorithm encrypting module, figured to operate hash algorithm to encrypt the third identifier.

The present disclosure, using a cloud end server, which can express the needed backup binding operation of the only first terminal and the third identifier of the only second terminal, and implement automatic binding of the first terminal and the only corresponding second terminal, so that the first terminal and the only corresponding second terminal can perform interaction through the application based on identical network platform, therefore, in the present disclosure, users are able to send information to the only corresponding second terminal by using the first terminal, which improves the user experience of the second terminal.

Realization of objectives, functional characteristics and advantages related to the disclosure will be illustrated in the subsequent descriptions and appended drawings.

DESCRIPTION OF EMBODIMENTS

It should be understood that the specific embodiments described herein are merely used for describing the present disclosure, but are not intended to limit the present disclosure.

The present disclosure provides a method for implementing automatic binding of first and second terminal. In the present disclosure, the first terminal generally refers to a mobile terminal, the second terminal generally refers to large screen displaying smart TV.

Figure 1:
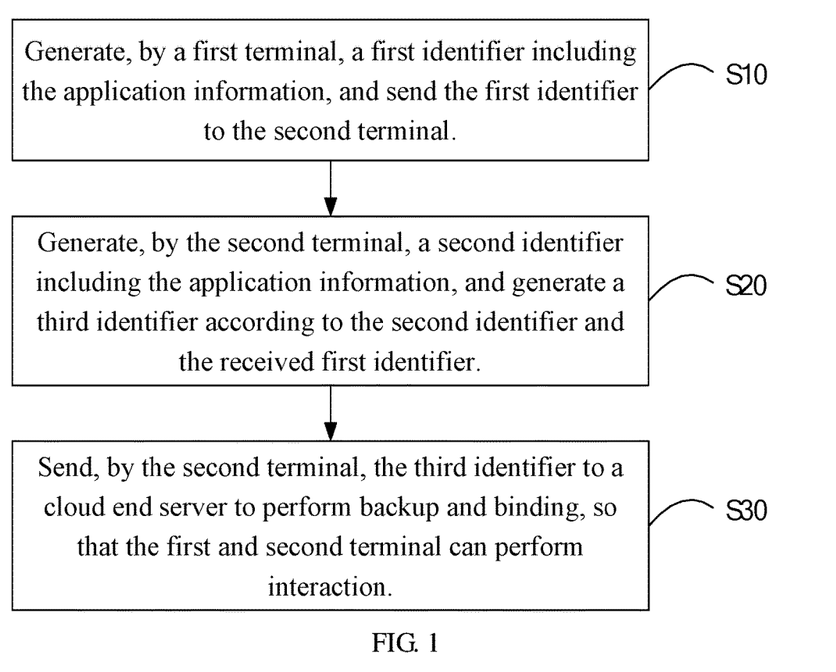
FIG. 1 is a schematic flowchart of a first embodiment of a method for implementing automatic binding of a first and second terminal of the present disclosure.

Referring to FIG. 1, FIG. 1 is a schematic flowchart of a first embodiment of a method for implementing automatic binding of a first and second terminal of the present disclosure.

In the first embodiment, the first and second terminal pre-install an application which based on identical network platform, and the method for implementing automatic binding of the first and second terminal includes:

Step S10: Generate, by the first terminal, a first identifier including the application information, and send the first identifier to the second terminal.

In the embodiment, the first identifier, including the application information, generated by the first terminal, is figured to uniquely express the first terminal itself, specifically, the first identifier contains the information of the application, but the first identifier is not limited only containing the informations of the application, and may also contains the information of the first terminal itself; In addition, the information of application may be a installation ID or an only installation number of the application and so on; The second terminal saves the first identifier after receiving the first identifier sent by the first terminal. In this embodiment, the first terminal may be smartphone, tablet, personal digital assistant (Personal Digital Assistant, PDA) or any other applicable first terminal.

Step S20: Generate, by the second terminal, a second identifier including the application information, and generate a third identifier according to the second identifier and the received first identifier.

In the embodiment, the second identifier, including the application information, generated by the second terminal, is figured to uniquely express the second terminal itself, specifically, the second identifier contains the informations of the application, but the second identifier is not limited only containing the information of the application, and may also contains the informations of the second terminal itself; In addition, the information of the application may be an installation ID or an only installation number of the application and so on; The third identifier is generated by combining the first identifier and the second identifier, that is, the third identifier contains all information of the first identifier and the second identifier, because the first identifier and the second identifier has uniqueness, so the third identifier also has uniqueness, and the third identifier reflects a kind of binding relationship of the first terminal and the second terminal, that is, the only corresponding relative binding of which first terminal and which second terminal may be known through the third identifier.

Step S30: Send, by the second terminal, the third identifier to a cloud end server to perform backup and binding, so that the first and second terminal can perform interaction.

In the embodiment, after receiving the third identifier sent by the second terminal, the cloud end sever saves and backups the third identifier, in order to implements the only corresponding relative binding of the first terminal and the second terminal, so that, the first terminal and the only corresponding second terminal can perform interaction; In this embodiment, the cloud end sever may provide a sever of OpenID (Decentralized Identification System), the third identifier is saved to a custom locale in user identity information of OpenID, to ensure that the third identifier will not be dropped for the second terminal shutting down, so that the phenomenon that cannot make relative binding of the first terminal and the second terminal for dropping the third identifier, may be avoided.

In the embodiment, what is called binding of the first and second terminal refers to the only corresponding relative relationship between the first terminal and second terminal, that is after implementing binding of the first and second terminal, the second terminal may be related directly through the first terminal, so that the first terminal may send messages to the second terminal.

It should be emphasized that, in the embodiment, the first and second terminal pre-install an application which based on identical network platform, and the application is the medium for the first terminal and the second terminal to perform interaction after binding; The application may be WeChat, Yixin, Feixin, or any other applicative application.

The embodiment, using a cloud end server, which express the needed binding and interacting of the only first terminal and the third identifier of the only second terminal to perform backup and binding, and implement automatic binding of the first terminal and the only corresponding second terminal, so that the first terminal and the only corresponding second terminal can perform interaction through the application based on identical network platform, therefore, the present disclosure implements users for being able to send information to the only corresponding second terminal by using the first terminal, and improves the user experience of the second terminal.

Figure 2:
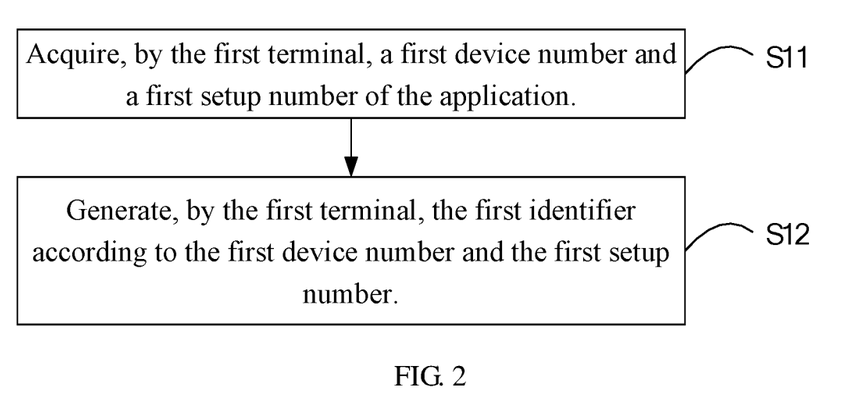
FIG. 2 is a detailing schematic flowchart of the step of generating, by the first terminal, a first identifier in FIG. 1.

Referring to FIG. 2, FIG. 2 is a detailing schematic flowchart of the step of the generating, by the first terminal, a first identifier in FIG. 1; In this embodiment, the specific step of the generating, by the first terminal, a first identifier including the application information includes:

Step S11: Acquire, by the first terminal, a first device number and a first setup number of the application.

In the embodiment, the first device number may be a IMEI (International Mobile Equipment Identity, International Mobile Equipment Identity) of the first terminal or a combination of a type of the first terminal and the IMEI of the first terminal, only if the first device number is able to uniquely express the first terminal; The first setup number may be the installation ID or the only installation number of the application.

Step S12: Generate, by the first terminal, the first identifier according to the first device number and the first setup number.

In the embodiment, the first identifier of the first terminal is generated according to the first device number and the first setup number of corresponding application, and is figured to uniquely express the first terminal itself, to ensure the uniqueness of the first terminal when implementing automatic binding of the first terminal and the only corresponding second terminal.

Figure 3:
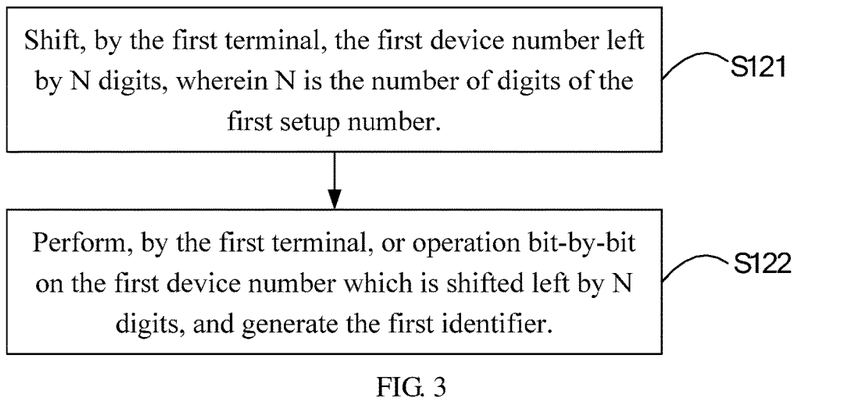
FIG. 3 is a detailing schematic flowchart of the step of generating, by the first terminal, the first identifier according to the first device number and the first setup number of the application in FIG. 2.

Referring to FIG. 3, FIG. 3 is a detailing schematic flowchart of the step of the generating, by the first terminal, the first identifier according to the first device number and the first setup number of the application in FIG. 2; In this embodiment, the specific step of Step S12 includes:

Step S121: Shift, by the first terminal, the first device number left by N digits, wherein N is the number of digits of the first setup number.

In the embodiment, takes a smartphone as an example of the first terminal, takes WeChat as an example of the application; Hypothesizes the smartphone acquires the first device number of 80002, and acquires the first setup number of 70001, because the digits of the first setup number of 70001 is 5, the smartphone shift the first device number of 80002 left by 5 digits to get 8000200000.

Step S122: Perform, by the first terminal, or operation bit-by-bit on the first device number which is shifted left by N digits, and generate the first identifier.

In the embodiment, by the step S121, the first device number of 8000200000 by shifting left by 5 digits may be got, after converting the first setup number of 70001 and the first device number of 8000200000 by shifting left by 5 digits into binary data, and performing or operation bit-by-bit on the two data, the first identifier of 8000270001 (converted from binary data) may be got, the first identifier of 8000270001 may uniquely express the smartphone.

It should be emphasized that, both of the first device number of 80002 and the first setup number of 70001 are hypothetical data, the actual data of the first device number and the first setup number may be confirmed according to the actual acquirement of the first terminal.

In other embodiments of the present disclosure, the specific step of the generating, by the first terminal, the first identifier according to the first device number and the first setup number of the application also includes: shifting, by the first terminal, the first setup number left by M digits, wherein M is the number of digits of the first device number; and performing, by the first terminal, or operation bit-by-bit on the setup device number which is shifted left by M digits, and generating the first identifier.

By using the arithmetic of this embodiment, the first identifier may be generated through combining the first device number and the first setup number of the application that acquired by the first terminal, the arithmetic of generating the first identifier is simple and fast, and it is convenience to implement, meanwhile, it may ensure that the first identifier may be configured to uniquely express the first terminal itself.

Figure 4:
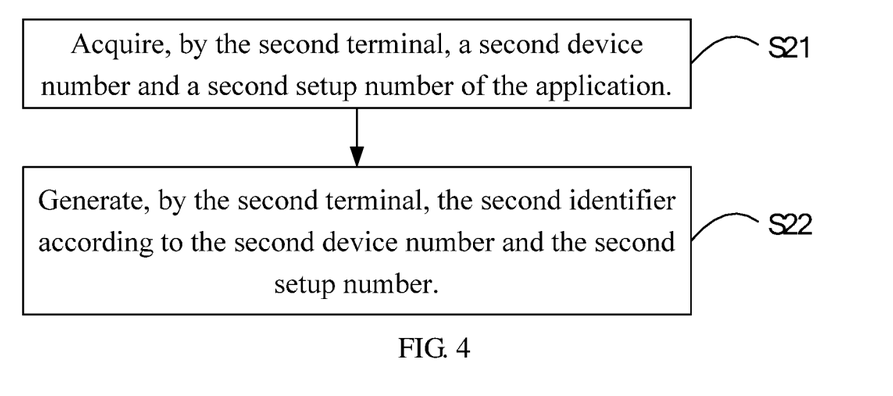
FIG. 4 is a detailing schematic flowchart of the step of generating, by the second terminal, a second identifier in FIG. 1.

Referring to FIG. 4, FIG. 4 is a detailing schematic flowchart of the step of the generating, by the second terminal, a second identifier in FIG. 1; In this embodiment, the specific step of the generating, by the second terminal, a second identifier including the application information includes:

Step S21: Acquire, by the second terminal, a second device number and a second setup number of the application.

In the embodiment, the second device number may be a device number of the second terminal or a combination of a type of the first terminal and a device number of another terminal, only if the second device number is able to uniquely express the second terminal; The second setup number may be the installation ID or the only installation number.

Step S22: Generate, by the second terminal, the second identifier according to the second device number and the second setup number.

In the embodiment, the second identifier of the second terminal is generated according to the second device number and the second setup number of corresponding application, and is figured to uniquely express the second terminal itself, to ensure the uniqueness of the second terminal when implementing automatic binding of the first terminal and the only corresponding second terminal.

In the embodiment, the arithmetic using to generate the second identifier by the second terminal and generate the third identifier by the second terminal are consistent with the arithmetic using to generate the first identifier by the first terminal, therefore, assuming that the second device number acquired by the second terminal is 500001, and the second setup number of corresponding application acquired by the second terminal is 900002, similarly, the second identifier generated by the second terminal is 500001900002, and according to the second identifier of 500001900002 and the first identifier of 8000270001, the third identifier generated by the second terminal is 500001900002800270001.

Figure 5:
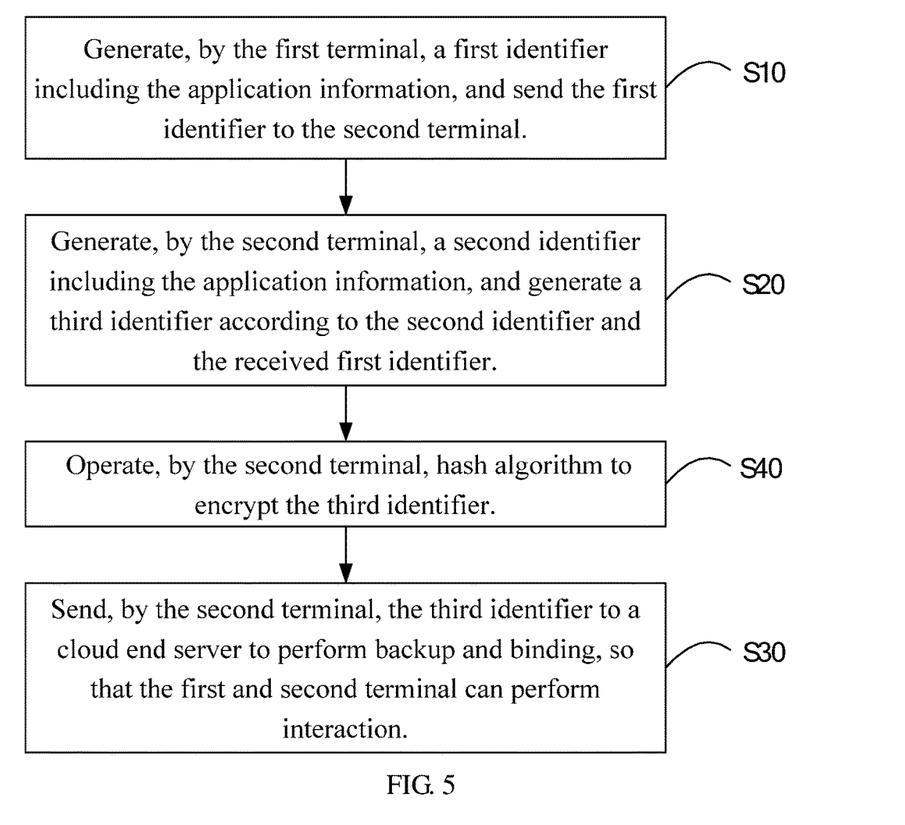
FIG. 5 is a schematic flowchart of a second embodiment of the method for implementing automatic binding of a first and second terminal of the present disclosure.

Referring to FIG. 5, FIG. 5 is a schematic flowchart of a second embodiment of the method for implementing automatic binding of a first and second terminal of the present disclosure.

Based on the method for implementing automatic binding of a first and second terminal in the first embodiment of the present disclosure, after operating the Step S20, and before operating the Step S30, the method for implementing automatic binding of a first and second terminal further includes:

Step S40: Operate, by the second terminal, hash algorithm to encrypt the third identifier.

This embodiment based on the foregoing first embodiment, before sending the third identifier to cloud end server to perform binding and backup, the third identifier (like 500001900002800270001) may be encrypted by operating hash algorithm first, then a new third identifier character string may be generated, because the encoding operation result of hash algorithm is exclusive, so the new third identifier may also express the needed binding and interacting of the only first terminal and the only second terminal, moreover, the digits of the new third identifier that encrypted by operating hash algorithm is constant, that is beneficial for the cloud end server to identify and manage the third identifier.

The present disclosure further provides a system for implementing automatic binding of first and second terminal.

Figure 6:
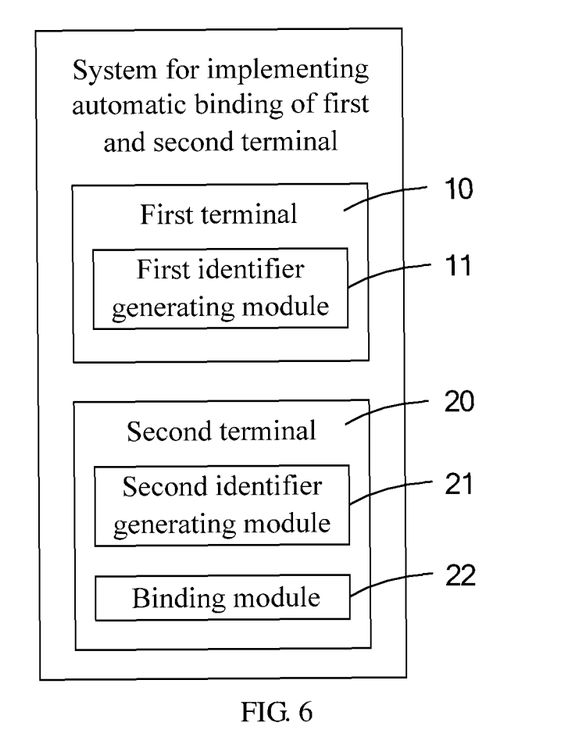
FIG. 6 is a schematic diagram of functional modules of a first embodiment of the system for implementing automatic binding of a first and second terminal of the present disclosure.

Referring to FIG. 6, FIG. 6 is a schematic diagram of functional modules of a first embodiment of the system for implementing automatic binding of a first and second terminal of the present disclosure;

In the first embodiment, the system for implementing automatic binding of a first and second terminal includes the first terminal 10 provided with a first identifier generating module 11, and the second terminal 20 provided with a second identifier generating module 21 and a binding module 22, wherein:

the first terminal 10 and the second terminal 20 pre-install an application which based on identical network platform;

The first identifier generating module 11, is configured to generate a first identifier, and send the first identifier to the second terminal;

The second identifier generating module 21, is configured to generate a second identifier, and generate a third identifier according to the second identifier and the received first identifier;

The binding module 22, is configured to send the third identifier to a cloud end server to perform backup and binding, so that the first terminal 10 and the second terminal 20 can perform interaction.

In the embodiment, the first identifier, generated by the first identifier generating module 11, is figured to uniquely express the first terminal 10 itself; The second identifier generating module 21 saves the first identifier after receiving the first identifier sent by the first identifier generating module 11. In this embodiment, the first terminal 10 may be smartphone, tablet, personal digital assistant (Personal Digital Assistant, PDA) or any other applicable first terminal. The second identifier, generated by the second identifier generating module 21, is figured to uniquely express the second terminal 20 itself; The third identifier is generated by the second identifier generating module 21 according to the first identifier and the second identifier, the third identifier reflects a kind of binding relationship of the first terminal 10 and the second terminal 20, that is, the only corresponding relative binding of which first terminal and which second terminal may be known through the third identifier. After receiving the third identifier sent by the binding module 40, the cloud end sever saves and backups the third identifier, in order to implements the only corresponding relative binding of the first terminal 10 and the second terminal 20, so that, the first terminal 10 and the only corresponding second terminal 20 can perform interaction; In this embodiment, the cloud end sever may provide a sever of OpenID (Decentralized Identification System), the third identifier is saved to a custom locale in user identity information of OpenID, to ensure that the third identifier will not be dropped for the second terminal 20 shutting down, so that the phenomenon that cannot make relative binding of the first terminal 10 and the second terminal 20 for dropping the third identifier, may be avoided.

In the embodiment, what is called binding of the first terminal 10 and the second terminal 20 refers to the only corresponding relative relationship between the first terminal 10 and the second terminal 20, that is after implementing binding of the first terminal 10 and the second 20 terminal, the second terminal 20 may be related directly through the first terminal 10, so that the first terminal 10 may send messages to the second terminal 20.

It should be emphasized that, in the embodiment, the first terminal 10 and the second terminal 20 pre-install an application which based on identical network platform, and the application is the medium for the first terminal 10 and the second terminal 20 to perform interaction after binding; The application may be WeChat, Yixin, Feixin, or any other applicative application.

The embodiment, using a cloud end server, which express the needed binding and interacting of the only first terminal 10 and the third identifier of the only second terminal 20 to perform backup and binding, and implement automatic binding of the first terminal 10 and the only corresponding second terminal 20, so that the first terminal 10 and the only corresponding second terminal 20 can perform interaction through the application based on identical network platform, therefore, the present disclosure implements users for being able to send information to the only corresponding second terminal 20 by using the first terminal 10, and improves the user experience of the second terminal 10.

Figure 7:
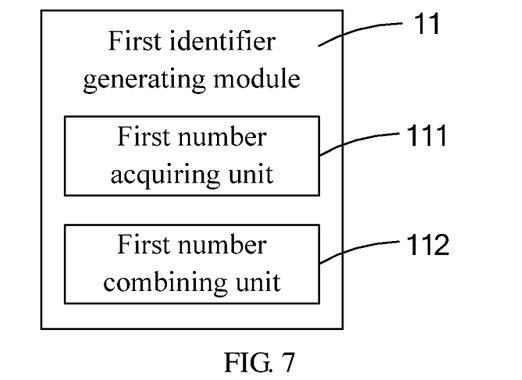
FIG. 7 is a detailing schematic diagram of functional modules of the first identifier generating module in FIG. 6.

Referring to FIG. 7, FIG. 7 is a detailing schematic diagram of functional modules of the first identifier generating module in FIG. 6; In this embodiment, the first identifier generating module 11 includes:

A first number acquiring unit 111, configured to acquire a first device number and a first setup number;

A first number combining unit 112, configured to generate the first identifier according to the first device number and the first setup number.

In the embodiment, the first device number may be a IMEI (International Mobile Equipment Identity, International Mobile Equipment Identity) of the first terminal 10 or a combination of a type of the first terminal 10 and the IMEI of the first terminal 10, only if the first device number is able to uniquely express the first terminal 10; The first setup number may be the installation ID or the only installation number of the application; The first identifier of the first terminal 10 is generated according to the first device number and the first setup number of corresponding application by the first number combining unit 112, and is figured to uniquely express the first terminal 10 itself, to ensure the uniqueness of the first terminal 10 when implementing automatic binding of the first terminal 10 and the only corresponding second terminal 20.

In the embodiment, the first number combining unit 112 is further configured to shift the first device number left by N digits wherein N is the number of digits of the first setup number, and configured to perform or operation bit-by-bit on the first device number which is shifted left by N digits and generate the first identifier.

Specifically, in the embodiment, takes a smartphone as an example of the first terminal 10, takes WeChat as an example of the application; Assuming that the first number acquiring unit 111 acquires the first device number of 80002, and acquires the first setup number of 70001, because the digits of the first setup number of 70001 is 5, the smartphone shift the first device number of 80002 left by 5 digits to get 8000200000, after converting the first setup number of 70001 and the first device number of 8000200000 by shifting left by 5 digits into binary data by the first number combining unit 112, the first identifier of 8000270001 (converted from binary data) may be got by performing or operation bit-by-bit on the two data, the first identifier of 8000270001 may uniquely express the smartphone.

It should be emphasized that, both of the first device number of 80002 and the first setup number of 70001are hypothetical data, the actual data of the first device number and the first setup number may be confirmed according to the actual acquirement of the first terminal 10.

In other embodiments of the present disclosure, the first number combining unit 112 is further configured to shift the first setup number left by M digits wherein M is the number of digits of the first device number, and configured to perform or operation bit-by-bit on the first setup number which is shifted left by M digits and generating the first identifier.

Figure 8:
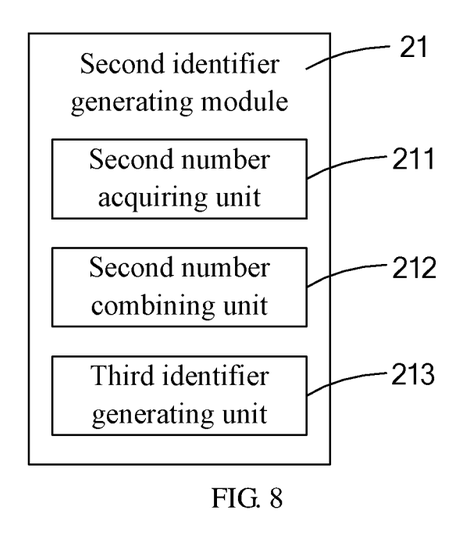
FIG. 8 is a detailing schematic diagram of functional modules of the second identifier generating module in FIG. 6.

Referring to FIG. 8, FIG. 8 is a detailing schematic diagram of functional modules of the second identifier generating module in FIG. 6. In this embodiment, the second identifier generating module 21 includes:

A second number acquiring unit 211, configured to acquire a second device number and a second setup number;

A second number combining unit 212, configured to generate the second identifier according to the second device number and the second setup number;

A third identifier generating unit 213, configured to generate the third identifier according to the second identifier and the received first identifier.

In the embodiment, the second device number may be a device number of the second terminal 20 or a combination of a type of the second terminal 20 and other device number, only if the second device number is able to uniquely express the second terminal 20; The second setup number may be the installation ID or the only installation number of the application; The second identifier of the second terminal 20 is generated according to the second device number and the second setup number of corresponding application by the second number combining unit 212, and is figured to uniquely express the second terminal 20 itself, to ensure the uniqueness of the second terminal 20 when implementing automatic binding of the first terminal 10 and the only corresponding second terminal 20. The third identifier is generated by the third identifier generating unit 213 according to the first identifier and the second identifier, that is, the third identifier may express the needed binding and interacting of the only first terminal 10 and the only second terminal 20.

Specifically, in the embodiment, the arithmetic using to generate the second identifier by the second identifier generating module 21 and generate the third identifier by the third identifier generating unit 213 are consistent with the arithmetic using to generate the first identifier by the first identifier generating module 11, therefore, assuming that the second device number acquired by the second number acquiring unit 211 is 500001, and the second setup number of corresponding application acquired by the second number acquiring unit 211 is 900002, similarly, the second identifier generated by the second number combining unit 212 is 500001900002, and according to the second identifier of 500001900002 and the first identifier of 8000270001, the third identifier generated by the third identifier generating unit 213 is 500001900002800027000l.

Figure 9:
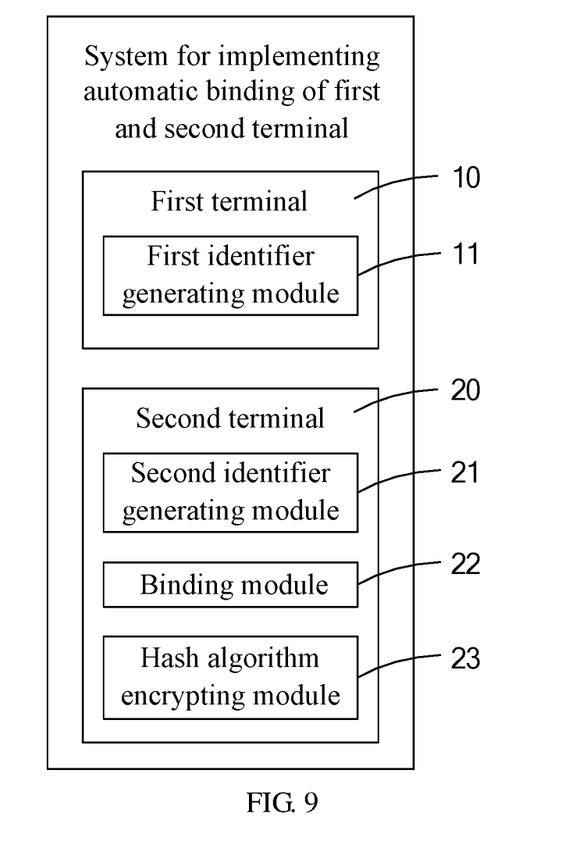
FIG. 9 is a schematic diagram of functional modules of a second embodiment of the system for implementing automatic binding of a first and second terminal of the present disclosure.

Referring to FIG. 9, FIG. 9 is a schematic flowchart of a second embodiment of the system for implementing automatic binding of a first and second terminal of the present disclosure.

Basing on the first embodiment of the system for implementing automatic binding of a first and second terminal of the present disclosure, the second terminal 20 is further includes:

A hash algorithm encrypting module 23, is figured to operate hash algorithm to encrypt the third identifier.

The embodiment based on the foregoing first embodiment, before sending the third identifier to cloud end server to perform binding and backup by the binding module 22, in order to perform interaction between the first terminal 10 and the second terminal 20, the third identifier (like 500001900002800027000l) may be encrypted by operating hash algorithm first by the hash algorithm encrypting module 23, then a new third identifier character string may be generated, because the encoding operation result of hash algorithm is exclusive, so the new third identifier may also express the needed binding and interacting of the only first terminal 10 and the only second terminal 20, moreover, the digits of the new third identifier that encrypted by operating hash algorithm is constant, that is beneficial for the cloud end server to identify and manage the third identifier.

The foregoing descriptions are merely preferable embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

What is claimed is:

1. A method for implementing automatic binding of a first and second terminal, wherein the first and second terminal pre-install an application which based on identical network platform, the application being a medium for the first terminal and the second terminal to perform interaction after binding, the first terminal being a mobile terminal, and the second terminal being a smart TV, and the method for implementing automatic binding of the first and second terminal comprises:

generating, by the first terminal, a first identifier comprising the application information and a first terminal information, and sending the first identifier to the second terminal;

generating, by the second terminal, a second identifier comprising the application information and a second terminal information, and generating a third identifier according to the second identifier and the received first identifier; and sending, by the second terminal, the third identifier to a cloud end server to perform backup and binding, so that the first and second terminal can perform interaction, the cloud end server being a server of OpenID (Decentralized Identification System), and the third identifier being saved to a custom locale in a user identity information of the OpenID.

2. The method for implementing automatic binding of a first and second terminal according to claim 1, wherein the step of generating, by the first terminal, a first identifier comprising the application information and a first terminal information comprises:

acquiring, by the first terminal, a first device number and a first setup number of the application; and generating, by the first terminal, the first identifier according to the first device number and the first setup number.

3. The method for implementing automatic binding of a first and second terminal according to claim 2, wherein the step of generating, by the first terminal, the first identifier according to the first device number and the first setup number of the application comprises:

shifting, by the first terminal, the first device number left by N digits, wherein N is the number of digits of the first setup number;

performing, by the first terminal, or operation bit-by-bit on the first device number which is shifted left by N digits, and generating the first identifier; or shifting, by the first terminal, the first setup number left by M digits, wherein M is the number of digits of the first device number;

performing, by the first terminal, or operation bit-by-bit on the setup device number which is shifted left by M digits, and generating the first identifier.

4. The method for implementing automatic binding of a first and second terminal according to claim 1, wherein the step of generating, by the second terminal, a second identifier comprising the application information and a second terminal information comprises:

acquiring, by the second terminal, a second device number and a second setup number of the application; and generating, by the second terminal, the second identifier according to the second device number and the second setup number.

5. The method for implementing automatic binding of a first and second terminal according to claim 2, wherein the step of generating, by the second terminal, a second identifier comprising the application information and a second terminal information comprises:

acquiring, by the second terminal, a second device number and a second setup number of the application; and generating, by the second terminal, the second identifier according to the second device number and the second setup number.

6. The method for implementing automatic binding of a first and second terminal according to claim 3, wherein the step of generating, by the second terminal, a second identifier comprising the application information and a second terminal information comprises:

acquiring, by the second terminal, a second device number and a second setup number of the application; and generating, by the second terminal, the second identifier according to the second device number and the second setup number.

7. The method for implementing automatic binding of a first and second terminal according to claim 6, wherein the first device number is a IMEI of the first terminal or a combination of a type number of the first terminal and the IMEI of the first terminal; and the second device number is a device number of the second terminal or a combination of a type number of the second terminal and the device number of the second terminal.

8. The method for implementing automatic binding of a first and second terminal according to claim 1, after the step of generating, by the second terminal, a second identifier comprising the application information and a second terminal information, and generating a third identifier according to the second identifier and the received first identifier, and before the step of sending, by the second terminal, the third identifier to a cloud end server to perform backup and binding, so that the first and second terminal can perform interaction comprises:

operating, by the second terminal, hash algorithm to encrypt the third identifier.

9. A system for implementing automatic binding between terminals, wherein the system comprises a cloud end server being a server of OpenID (Decentralized Identification System), a first terminal being a mobile terminal, and a second terminal being a smart TV, wherein:

the first terminal and the second terminal pre-install an application which based on identical network platform, the application being a medium for the first terminal and the second terminal to perform interaction after binding;

the first terminal generates a first identifier comprising the application information and a first terminal information and sends the first identifier to the second terminal;

the second terminal generates a second identifier comprising the application information and a second terminal information and generates a third identifier according to the second identifier and the received first identifier; and the second terminal sends the third identifier to the cloud end server to perform backup and binding, so that the first and second terminal perform interaction, the third identifier being saved to a custom locale in a user identity information of the OpenID.

10. The system according to claim 9, wherein the first terminal acquires a first device number and a first setup number and generates the first identifier according to the first device number and the first setup number.

11. The system according to claim 10, wherein the first terminal shifts the first device number left by N digits wherein N is the number of digits of the first setup number, and performs or operation bit-by-bit on the first device number which is shifted left by N digits and generates the first identifier; or the first terminal shifts the first setup number left by M digits wherein M is the number of digits of the first device number, and performs or operation bit-by-bit on the first setup number which is shifted left by M digits and generates the first identifier.

12. The system according to claim 9, wherein the second terminal acquires a second device number and a second setup number, generates the second identifier according to the second device number and the second setup number, and generates the third identifier according to the second identifier and the received first identifier.

13. The system for implementing automatic binding of a first and second terminal according to claim 10, wherein the second
  terminal acquires a second device number and a second setup number,
  generates the second identifier according to the second device number and the second setup number,
  and generates the third identifier, according to the second identifier and the received first identifier.

14. The system for implementing automatic binding of a first and second terminal according to claim 11, wherein the second
  terminal acquires a second device number and a second setup number,
  generates the second identifier according to the second device number and the second setup number,
  and generates the third identifier according to the second identifier and the received first identifier.

15. The method according to claim 14, wherein the first device number is a IMEI of the first terminal or a combination of a type number of the first terminal and the IMEI of the first terminal; and the second device number is a device number of the second terminal or a combination of a type number of the second terminal and the device number of the second terminal.

16. The system according to claim 9, wherein the second terminal further
  operates hash algorithm to encrypt the third identifier.

* * * * *